United States Patent [19]

Suzuki

[11] Patent Number: 5,546,565
[45] Date of Patent: Aug. 13, 1996

[54] INPUT/OUTPUT APPARATUS HAVING A PEN, AND METHOD OF ASSOCIATING AND PROCESSING HANDWRITTEN IMAGE DATA AND VOICE DATA

[75] Inventor: Hideo Suzuki, Tokyo, Japan

[73] Assignee: Casio Computer Co., Ltd., Tokyo, Japan

[21] Appl. No.: 252,280

[22] Filed: Jun. 1, 1994

[30] Foreign Application Priority Data

Jun. 21, 1993 [JP] Japan .................................. 5-172117
Jun. 25, 1993 [JP] Japan .................................. 5-177519

[51] Int. Cl.$^6$ .............................. G06K 9/18; G06K 9/22; G10L 5/02
[52] U.S. Cl. .............................. 395/500; 395/2; 382/187
[58] Field of Search .............................. 395/500, 200, 395/2, 2.6, 2.80, 2.81, 2.82, 2.84; 364/900; 382/146, 154, 186, 187, 188, 189; 434/112–116, 159, 169, 201, 205, 319, 320

[56] References Cited

U.S. PATENT DOCUMENTS

| | | | |
|---|---|---|---|
| 3,761,877 | 9/1973 | Fernald | 382/315 |
| 4,457,719 | 7/1984 | Dittakavi et al. | 395/2 |
| 4,475,239 | 10/1984 | van Raamsdonk | 382/309 |
| 4,531,231 | 7/1985 | Crane et al. | 382/175 |
| 4,680,804 | 7/1987 | Kuzunuki et al. | 382/185 |
| 4,726,065 | 2/1988 | Froessl | 381/41 |
| 4,793,812 | 12/1988 | Sussman et al. | 434/116 |
| 4,924,387 | 5/1990 | Jeppesen | 364/409 |
| 4,931,950 | 6/1990 | Isle et al. | 395/154 |
| 4,945,504 | 7/1990 | Nakama et al. | 364/709.11 |
| 4,972,496 | 11/1990 | Sklarew | 382/187 |
| 4,985,929 | 1/1991 | Tsuyama | 382/187 |
| 5,022,086 | 6/1991 | Crane et al. | 382/187 |
| 5,058,182 | 10/1991 | Kuan et al. | 382/187 |
| 5,107,541 | 4/1992 | Hilton | 382/123 |
| 5,231,691 | 7/1993 | Yasuda | 395/2 |
| 5,231,698 | 7/1993 | Forcier | 395/146 |
| 5,283,731 | 2/1994 | Lalonde et al. | 364/401 |
| 5,297,216 | 3/1994 | Sklarew | 382/189 |
| 5,305,394 | 4/1994 | Tanaka | 382/189 |
| 5,333,209 | 7/1994 | Sinden et al. | 382/187 |
| 5,341,438 | 8/1994 | Clifford | 382/179 |
| 5,361,310 | 11/1994 | Ishigaki | 382/187 |
| 5,410,612 | 4/1995 | Arai et al. | 382/187 |
| 5,416,892 | 5/1995 | Loken-Kim | 382/187 |
| 5,448,475 | 9/1995 | Senoo et al. | 382/187 |
| 5,452,371 | 9/1995 | Bozinovic et al. | 382/187 |

*Primary Examiner*—Kevin J. Teska
*Assistant Examiner*—Tyrone V. Walker
*Attorney, Agent, or Firm*—Frishauf, Holtz, Goodman, Langer & Chick

[57] ABSTRACT

An input/output apparatus records both a handwritten image and a speech to facilitate the collation between the recorded image and speech. When a command recognizing section recognizes that a handwritten image input through a coordinate input section is a voice command image, a voice processor starts recording the speech, input from a microphone, into a voice recording memory. During this recording, the voice processor sets the input handwritten image as a key image. When an end command image is written, the voice processor registers the speech, recorded in the voice recording memory, into a voice register file in association with the key image. When an image identical to the registered key image is input, the voice processor reads the speech corresponding to the key image from the voice register file into the voice recording memory, and reproduces the speech from a loudspeaker.

8 Claims, 7 Drawing Sheets

FIG.4A
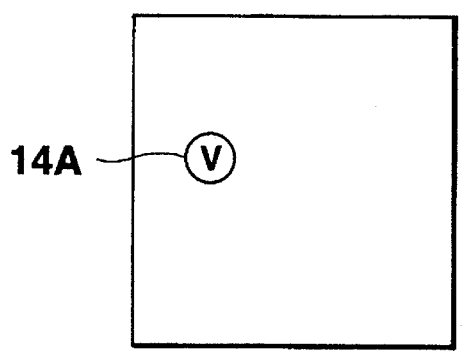
FIG.4B
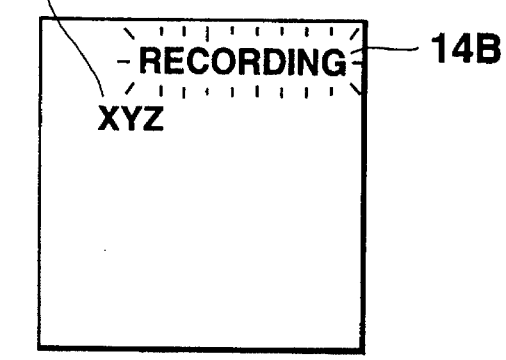
FIG.4C
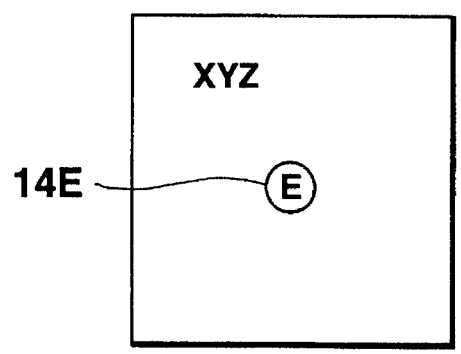
FIG.4D
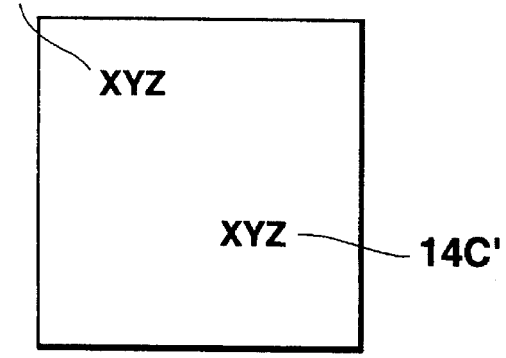
FIG.5
| RETRIEVAL KEY IMAGE | RECORDED SPEECH |
|---|---|
| XYZ | "ABCD · · · · " |
| ◎ | "EFGH · · · · " |
| ▱ | "IJKLM · · · · " |
| ( | ( |

FIG.9

| KEY SPEECH | REGISTERED IMAGE |
|---|---|
| "XYZ" | ☆◁ |
| "KMW" | ⟨⟨⟨ ------ |
|  | ⟨   ⟨ |

INPUT/OUTPUT APPARATUS HAVING A PEN, AND METHOD OF ASSOCIATING AND PROCESSING HANDWRITTEN IMAGE DATA AND VOICE DATA

BACKGROUND OF THE INVENTION

1. Field of the Invention

The present invention relates to an input/output apparatus which displays data, handwritten with a pen, on the display screen, and analyzes and processes the handwritten data.

2. Description of the Related Art

People often take notes in meetings, conferences or the like as memos. To assist people in making memos, handwriting apparatuses or so called "electronic notebooks," have been developed as a replacement of ordinary paper notebooks.

In a meeting, conference or the like, important speeches or opinions may be recorded on a tape recorder for later confirmation or for later preparation of proceedings. To take notes on an electronic notebook and record speeches on a tape recorder in a meeting, conference or the like, conventionally, a user should carry both devices. As the two devices are separately operated, the handwritten notes and recorded speeches should be collated with each other. This collation takes time and thus stands in the way of fast confirmation of the contents of the meeting or quick preparation of proceedings.

Further, the user may not promptly operate the two devices and may not therefore be able to concentrate on the contents of the meeting or conference, so that the user would understand the contents of the meeting or conference only after confirming them with those devices which should be used as assisting tools.

The techniques for accomplishing various editions, such as data insertion and deletion, with data and/or commands handwritten with a pen are disclosed in, for example, U.S. Pat. No. 4,945,504, 4,972,496 and 4,475,239.

More specifically, those U.S. patents teach the schemes of deleting data displayed at a position where an editing command image is handwritten, or inserting desired handwritten data at such a position.

Those disclosed schemes process only data that is input with an input device, such as a pen or a keyboard, and none of the U.S. patents teach the technique of accessing and processing data that is input with a voice input device. What is more, none of the U.S. patents consider or suggest a scheme of managing data handwritten with a pen and input voice data in close association with each other.

SUMMARY OF THE INVENTION

It is therefore a primary object of the present invention to provide an input/output apparatus which can manage data, handwritten with a pen, and voice data, input through a voice inputting device, in close association with each other.

It is another object of the present invention to provide an input/output apparatus with an excellent operability, which can associate handwritten input data with input voice data whereby data input/output, data edition, etc. are executed using the input screen and output screen.

To achieve the above objects, according to one aspect of this invention, there is provided an input/output apparatus for inputting and displaying a desired handwritten image using a pen on a display screen, which apparatus comprises:

first input means for inputting an image through an operation of the pen;

second input means for inputting voices;

memory means for storing the image, input through the first input means, as image data and storing the voices, input through the second input means, as voice data;

discriminating means for discriminating whether or not image data corresponding a new image, when input through the first input means, is stored in the memory means; and voice output means for reading the voice data from the memory means, converting the voice data to voices and outputting the voices.

With the above structure, a user should simply input an image with the pen to automatically reproduce voice data stored in association with image data.

If plural types of patterns for associating the image data with voice data are prepared, it is possible to automatically reproduce only the voices that correspond to each input image.

Further, voices may be input instead of an image so that the corresponding image can automatically be read from the memory and input in the apparatus.

To achieve the above objects, according to another aspect of this invention, there is provided a method of associating and processing handwritten image data and voice data, comprising:

a first step of inputting a start command instructing a start of recording of voice data through an input device;

a second step of inputting an end command instructing an end of recording of the voice data through the input device;

a third step of starting recording of the voice data in response to the start command input in the first step and ending the recording in response to the end command input in the second step;

a fourth step of inputting image data for specifying the voice data recorded in the third step;

a fifth step of associating the voice data recorded in the third step with the image data input in the fourth step;

a sixth step of inputting image data substantially equivalent to the image data input in the fourth step after the step is executed; and a seventh step of outputting the voice data which was recorded in the third step and associates with the image data input in the sixth step, in accordance with the association set in the fifth step.

With the above structure, a user should simply handwrite image data by, for example, a pen to automatically reproduce voice data stored in association with image data.

Voice data may be input instead of image data to retrieve and output the corresponding image.

BRIEF DESCRIPTION OF THE DRAWINGS

FIGS. 4A–4D are diagrams showing display examples according to handwriting operations of the handwriting apparatus of the first embodiment;

FIG. 5 is a diagram showing the structure of a voice register file shown in FIG. 1;

FIG. 9 is a diagram showing the structure of an image register file shown in FIG. 6.

DETAILED DESCRIPTION OF THE PREFERRED EMBODIMENTS

A first embodiment of the present invention will now be described with reference to FIGS. 1 through 5.

Figure 1:
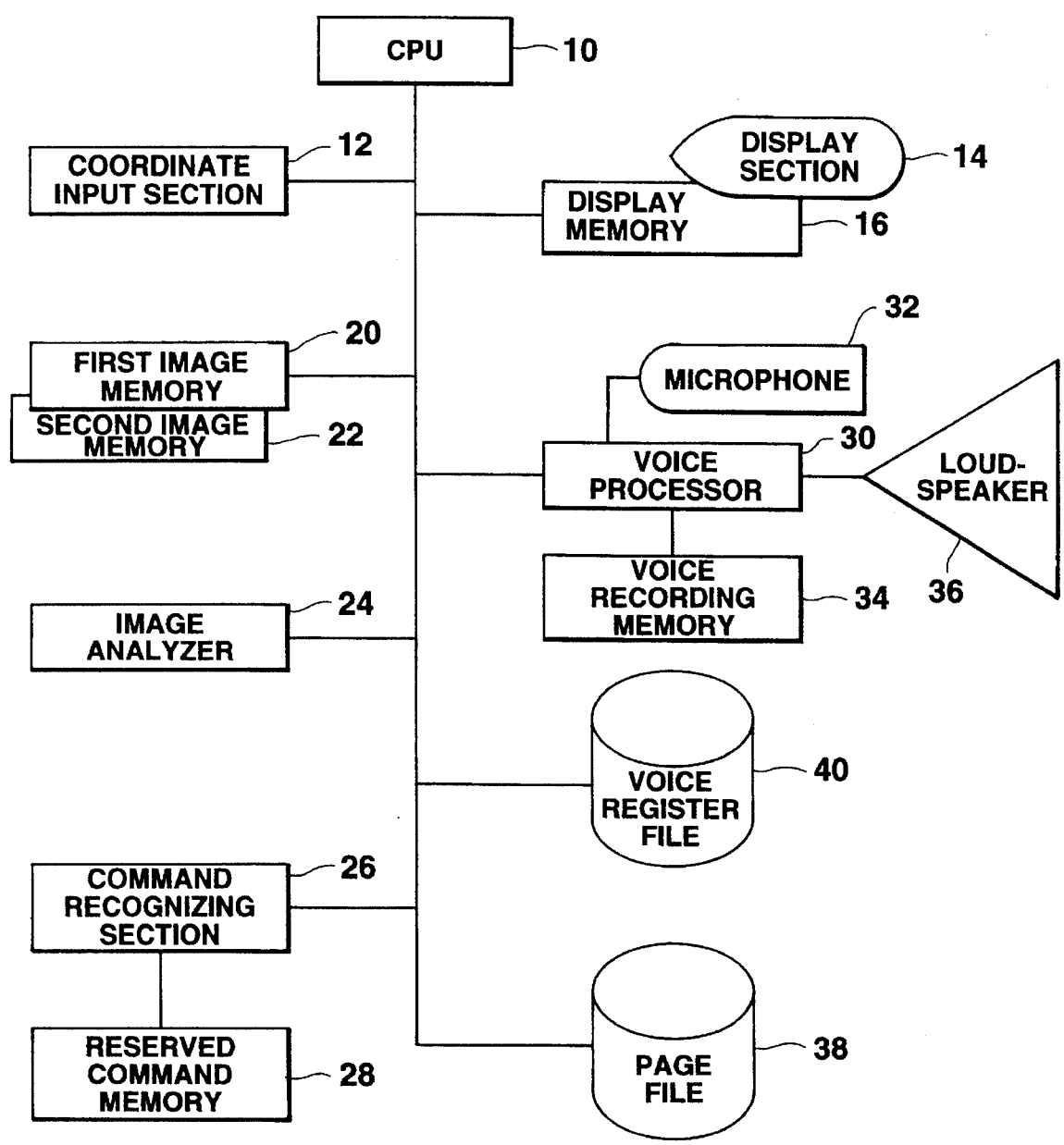
FIG. 1 is a block structural diagram of a handwriting apparatus according to a first embodiment of the present invention.
Figure 2:
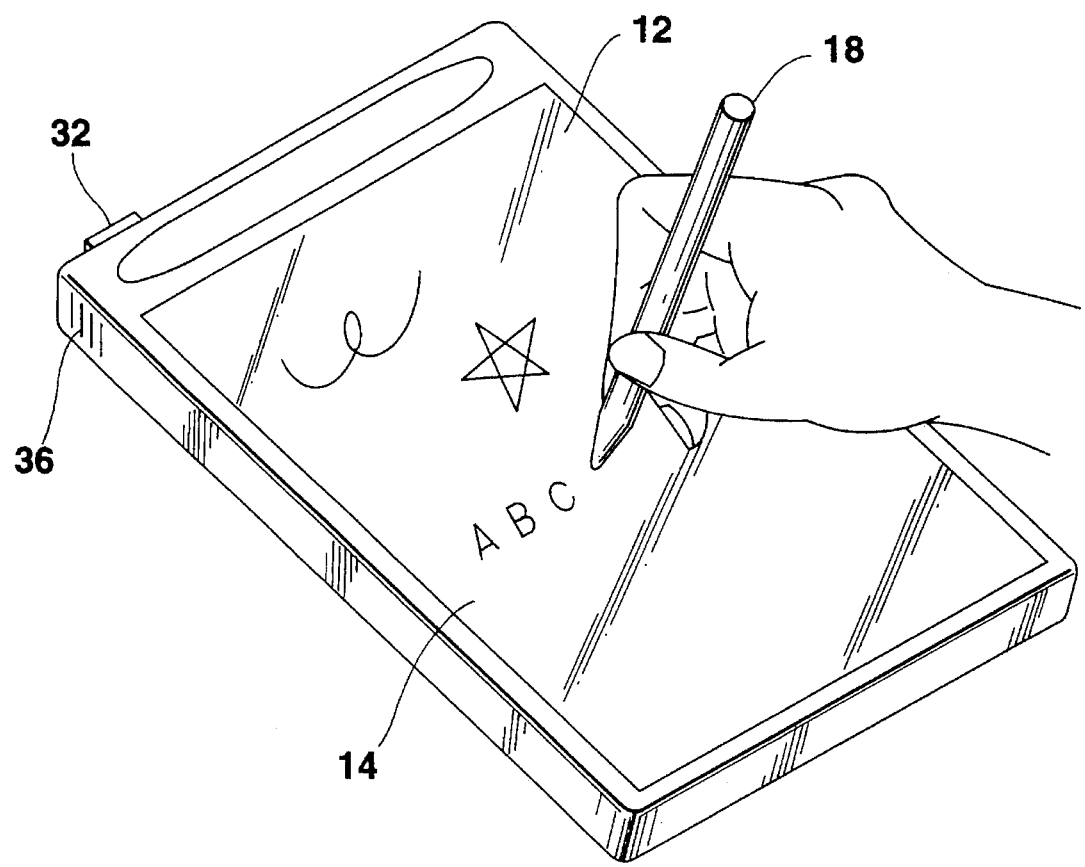
FIG. 2 is a perspective view showing the outline of the handwriting apparatus according to the first embodiment.

FIG. 1 presents a block diagram showing the structure of a handwriting apparatus according to the first embodiment. In FIG. 1, reference numeral "10" denotes a CPU (Central Processing Unit) which performs the general control of this handwriting apparatus, reference numeral "12" is a coordinate input section, and reference numeral "14" is a display section for displaying data developed in a display memory 16. The coordinate input section 12 comprises a touch panel tablet located on the display section 14, or light-emitting elements and light-receiving elements arranged in rows and columns around the display section 14, as shown in FIG. 2. This coordinate input section 12 detects the coordinates of the tip of a pen (stylus) 18. The coordinate input section 12 and display section 14 of the handwriting apparatus according to this embodiment have a size of, for example, A4. The display section 14 comprises, for example, a liquid crystal (LC) display device with a back-light.

A first image memory 20 stores, in a bit map form, image data, produced by the CPU 10 based on the coordinates of handwritten data detected by the coordinate input section 12. A second image memory 22 stores one page of image data, which has already been input, in a bit map form. An image analyzer 24 analyzes an image stored in the first image memory 20. A command recognizing section 26 determines if an image, analyzed by the image analyzer 24, is equivalent to an image corresponding to a command stored in a reserved command memory 28 (if the similarity is equal to or greater than a predetermined value).

A voice processor 30 performs such control as to temporarily record voices (voice data), input through a microphone 32, into a voice recording memory 34 and output the voices, recorded in the voice recording memory 34, from a loudspeaker 36.

A page file 38 stores plural pages of image data, e.g., a maximum of fifty A4-size pages of image data. A voice register file 40 registers voices which have temporarily been stored in the voice recording memory 34.

Figure 3:
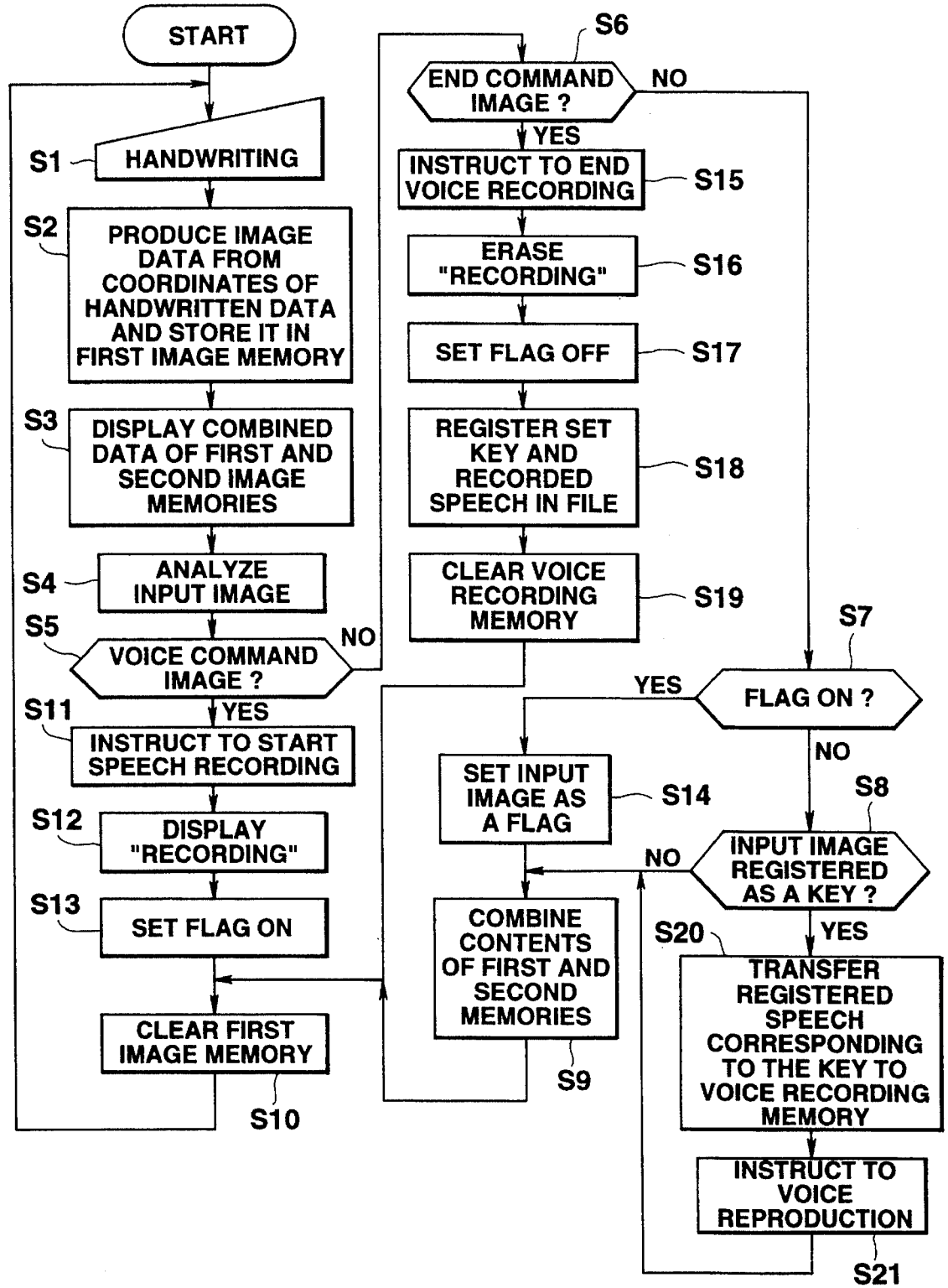
FIG. 3 is a flowchart for explaining the operation of the first embodiment.

The operation of the handwriting apparatus with the above structure will now be described with reference to a flowchart in FIG. 3.

First, when the user moves the pen 18 on the coordinate input section 12 to handwrite data, the coordinate input section 12 detects the time-to-time positions of the tip of the pen 18 based on the well-known position detecting technique to produce coordinate data (the locus of the tip of the pen 18) and sends the coordinate data to the CPU 10 (step S1). The CPU 10 produces image data from the received coordinate data and stores the image data, in a bit map form, in the first image memory 20 (step S2). Further, the CPU 10 combines the data in the first image memory 20 with the data in the second image memory 22, and writes the resultant data in the display memory 16 to display this data on the display section 14 (step S3).

Next, the image analyzer 24 analyzes the current input image stored in the first image memory 20 (step S4). Then, the command recognizing section 26 determines if the image, analyzed by the image analyzer 24, is equivalent (identical or similar) to an image corresponding to a predetermined voice command stored in the reserved command memory 28 using, for example, the ordinary pattern matching scheme (step S5). When the similarity exceeds to a predetermined value, it is determined that both images are equivalent to each other.

When the input image is not equivalent to the image corresponding to the voice command in step S5, the command recognizing section 26 then determines if the input image is equivalent (identical or similar) to an end command image (step S6). When it is not determined in step S6 that the input image is equivalent to the end command image, the CPU 10 detects the status of a flag (not shown) (step S7). The flag may be provided in a register in the CPU 10, or a storage area of any memories. When this flag is off, the CPU 10 determines whether or not a key image equivalent (identical or similar) to the currently input image is registered in the voice register file 40 whose details will be given later using, for example, the ordinary pattern matching scheme (step S8). When no key image equivalent to the currently input image is registered in the voice register file 40, the CPU 10 combines (ORs) the contents of the first image memory 20 and the second image memory 22, and stores the resultant image data again in the second image memory 22 (step S9). Then, the CPU 10 clears the first image memory 20 (step S10) and repeats the sequence of processes from the step S1.

Accordingly, an arbitrary image handwritten on the coordinate input section 12 with the pen 18 is displayed at the corresponding position on the display section 14, and the corresponding image data is stored in the second image memory 22 and the display memory 16.

When it is determined in the aforementioned step S5 that the input image is equivalent to the voice command image stored in the reserved command memory 28, the CPU 10 is informed of the decision result by the command recognizing section 26, and instructs the voice processor 30 to start recording voices. Assuming that the voice command image registered in the reserved command memory 28 is "V" in a circle as indicated by reference numeral "14A" in FIG. 4A (hereinafter called "circled V") and the handwritten image is a circled V shown in FIG. 4A (or a similar image), the CPU 10 instructs the voice processor 30 to start recording voices or a speech. In response to this instruction, the voice processor 30 records voices or a speech, e.g., "I am . . . ," input from the microphone 32, into the voice recording memory 34 (step S11) and controls the display memory 16 to display a message "recording" 14B on the display section 14 as shown in FIG. 4B (step S12). After the flag is set on (step S13), the flow proceeds to the aforementioned step S10 to clear the contents of the first image memory 20. (Therefore, the image "circled V" 14A will disappear soon as shown in FIG. 4B.) Thereafter, the CPU 10 performs the sequence of processes starting from the step S1.

When the user inputs an arbitrary image on the coordinate input section 12 with the pen 18, the flow moves to step S7 through steps S1 to S6. When it is determined in step S7 that the flag is on, the handwritten image input in step S1, e.g., an image "XYZ" 14C as shown in FIG. 4B is set as a retrieval key image as shown in FIG. 5 (step S14). The flow then proceeds to the aforementioned step S9 to combine the contents of the first image memory 20 and the second image memory 22 and store the resultant image data again in the second image memory 22, clears the first image memory 20 in step S10, and repeats the sequence of processes from the step S1.

When the user writes the end command image, previously registered in the reserved command memory 28, on the coordinate input section 12 with the pen 18, the input image is determined as equivalent to the end command image in the aforementioned step S6. Supposing that the end command image is "E" in a circle as indicated by reference numeral "14D" in FIG. 4C (hereinafter called "circled E"), when this circled E is written, it is detected in step S6. In response to this determination, the CPU 10 instructs the voice processor 30 to terminate the recording of a speech input through the microphone 32 into the voice recording memory 34 is terminated (step S15), and controls the display memory 16 to erase the message "recording" 14B (step S16). Then, the CPU 10 sets the flag off (step S17) and registers the recorded speech in the voice recording memory 34 (i.e., "ABCD . . . ") in the voice register file 40 in association with the key image 14C ("XYZ"), set in the step S14, as shown in FIG. 5 (step S18). Then, the CPU 10 clears the voice recording memory 34 (step S19), proceeds to the step S10 to clear the first image memory 20 (so that the image "circled E" 14D will disappear soon), and repeats the sequence of processes starting from the step S1.

As apparent from the above description, when the voice command image "circled V" 14B is written on the page on which data is currently handwritten, the handwriting apparatus of this embodiment starts recording a speech in the voice recording memory 34 using the image input during this voice recording as a retrieval key image. When the end command image "circled E" 14D is written, the speech recorded in the voice recording memory 34 is registered in the voice register file 40 in association with the retrieval key image.

It is of course possible to write a plurality of voice commands (or register plural pieces of voice data) on the same page (see FIG. 5). When the user uses the pen 18 and inputs an image 14C' identical (or similar) to the image "XYZ" 14C, already registered as the retrieval key image, as shown in FIG. 4D, it is determined in the step S8 that the currently input image is already included in the retrieval key images registered in the voice register file 40. In this case, the CPU 10 transfers the registered speech corresponding to that key image to the voice recording memory 34 (step S20), instructs the voice processor 30 to start reproducing the speech ("I am . . . ") in the voice recording memory 34 from the loudspeaker 36 (step S21). Thereafter, the CPU 10 moves to the step S9 to combine the contents of the first image memory 20 and the second image memory 22 and store the resultant image data in the second image memory 22. Then, the CPU 10 clears the first image memory 20 (step S10) and repeats the sequence of processes starting from the step S1.

As described above, when an image identical (or similar) to a registered key image, this handwriting apparatus automatically reproduces the speech that is registered in the voice register file in association with this image.

That is, this handwriting apparatus can register any handwritten image as a key for a recorded speech, so that when this image is handwritten, this apparatus can reproduce the corresponding speech any time.

The key image is not limited to the one that is input during voice recording, but may be associated with a recorded speech later. Further, an image which has been input immediately before voice recording starts (image which has been input just before the voice command image) may be used as the key image.

The start and end of voice recording may be instructed by a predetermined key operation, not by handwritten data.

A second embodiment of the present invention will now be described with reference to FIGS. 6 through 8.

Figure 6:
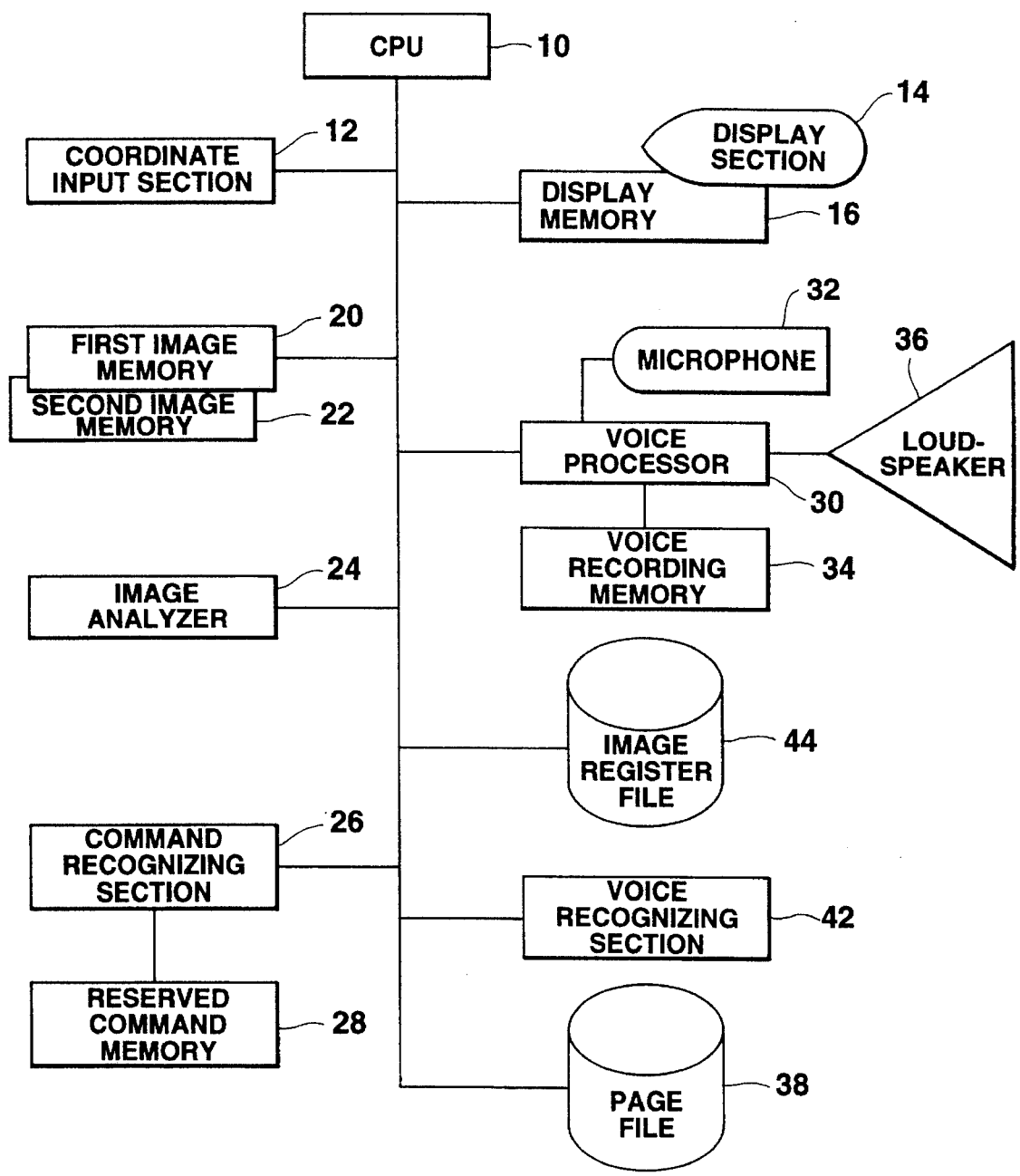
FIG. 6 is a block structural diagram of a handwriting apparatus according to a second embodiment of the present invention.
Figure 7:
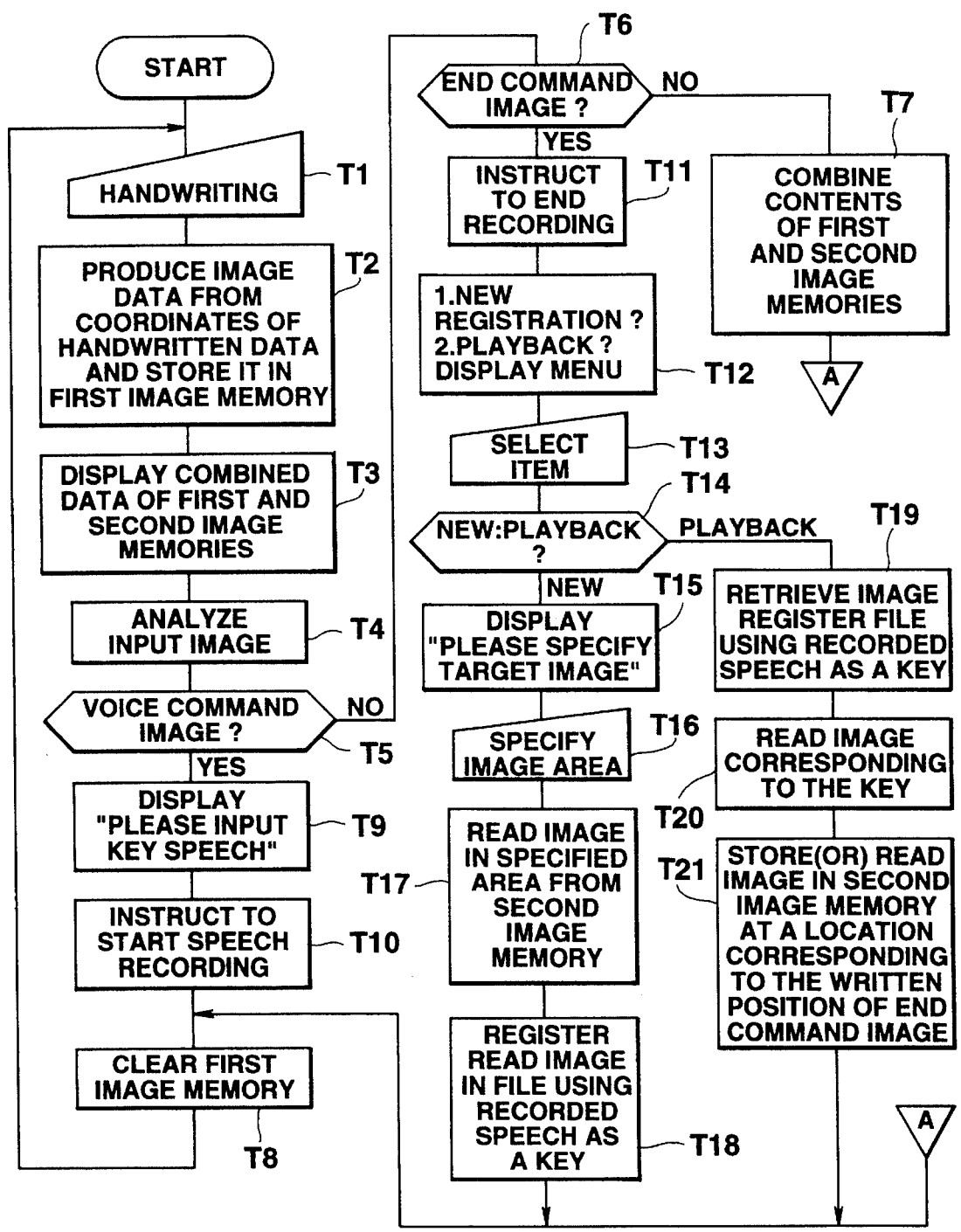
FIG. 7 is a flowchart for explaining the operation of the handwriting apparatus according to the second embodiment.

FIG. 6 is a block diagram showing the structure of a handwriting apparatus according to the second embodiment. In FIG. 6, the same components as shown in FIG. 1 are denoted by the same reference numerals to avoid repeating their description.

In FIG. 6, reference numeral "44" denotes an image register file for storing a speech and a handwritten image in association with each other, and reference numeral "42" denotes a voice recognizing section which recognizes voices input through the microphone 32.

The operation of the handwriting apparatus with the illustrated structure will now be described with reference to a flowchart in FIG. 7.

First, when the user operates the pen 18 to handwrite data (step T1), the coordinate input section 12 sequentially produces coordinate data of the locus of the tip of the pen 18. The CPU 10 produces image data from the coordinate data and stores the image data in the first image memory 20 (step T2). The CPU 10 then combines the data in the first image memory 20 with the data in the second image memory 22, and writes the resultant data in the display memory 16 to display this data on the display section 14 (step T3).

Next, the image analyzer 24 analyzes the current input image stored in the first image memory 20 (step T4). Then, the command recognizing section 26 determines if the image, analyzed by the image analyzer 24, is equivalent (identical or similar) to an image corresponding to a predetermined voice command stored in the reserved command memory 28 using, for example, the ordinary pattern matching scheme (step T5).

When determining that the input image is not equivalent to the image corresponding to the voice command, the command recognizing section 26 then determines if the input image is equivalent (identical or similar) to an end command image (step T6). When the input image is not equivalent to the end command image, the CPU 10 combines (ORs) the contents of the first image memory 20 and the second image memory 22, and stores the resultant image data again in the second image memory 22 (step T7). Then, the CPU 10 clears the first image memory 20 (step T8) and repeats the sequence of processes from the step T1.

Figure 8A:
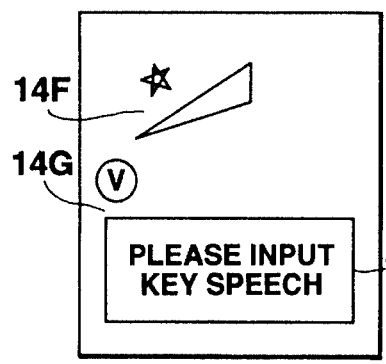
FIGS. 8A–8E are diagrams showing display examples according to handwriting operations of the handwriting apparatus of the second embodiment.
Figure 8B:
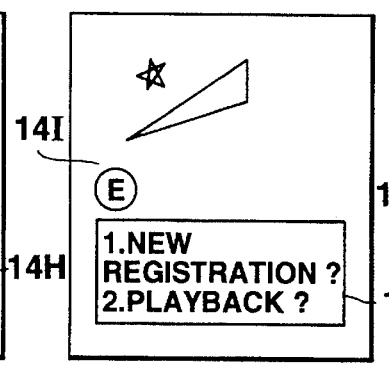

Accordingly, an arbitrary handwritten image 14F (as shown in FIG. 8A) handwritten in step T1 is displayed on the display section 14 (or the corresponding image data is stored in the second image memory 22 and the display memory 16).

When it is determined in the step T5 that the input image is equivalent to the voice command image (e.g., a "circled V" indicated by reference numeral "14G" in FIG. 8A), the CPU 10 controls the display memory 16 to display a message 14H "please input a key speech," which requests the inputting of a speech, on the display section 14 as shown in FIG. 8A (step T9). Then, the CPU 10 instructs the voice processor 30 to start recording a speech. In response to this instruction, the voice processor 30 starts a process of recording a speech, e.g., "I am . . . ," input from the microphone 32, into the voice recording memory 34 (step T10). The flow proceeds to step T8 where the CPU 10 clears the first image memory 20 (so that the voice command image "circled V" 14F will disappear soon). Thereafter, the CPU 10 repeats the sequence of processes starting from the step T1.

Figure 8C:
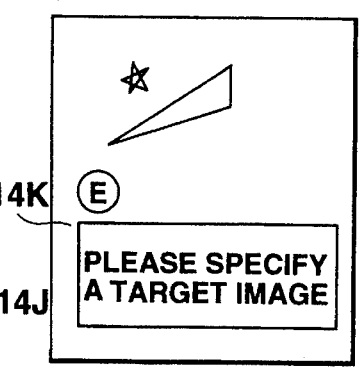
Figure 8D:
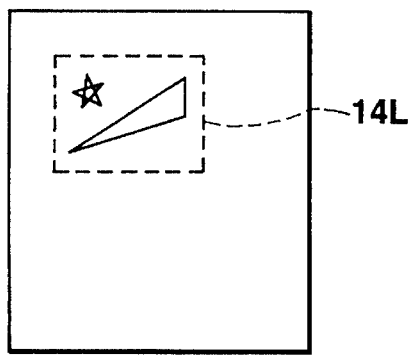
Figure 8E:
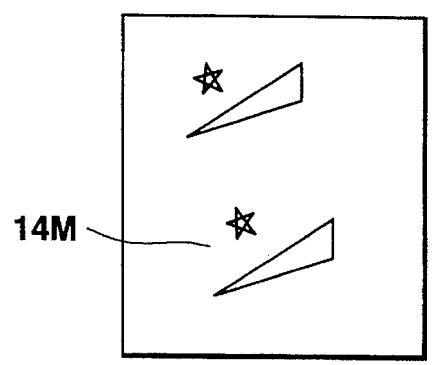

When it is determined in the step T6 that the input image is equivalent to the end command image (e.g., a "circled E" indicated by reference numeral "14I" in FIG. 8B), the CPU 10 instructs the voice processor 30 to terminate the voice recording. In response to this instruction, the voice processor 30 terminates the recording of a speech, input through the microphone 32, into the voice recording memory 34 (step T11). The CPU 10 controls the display memory 16 to display a selection menu 14J including items "1. New registration? 2. Playback?" on the display section 14 (step T12). When the user selects one of the items with the pen 18 (step T13), the coordinate input section 12 detects the coordinates of the position indicated by the pen 18 and informs the CPU 10 of the coordinates. The CPU 10 determines the selected item from the informed coordinates (step T14). When the selected item is "New registration," the CPU 10 controls the display memory 16 to display a message 14K "please specify a target image" on the display section 14 as shown in FIG. 8C (step T15). When the user specifies a rectangular image area 14L, indicated by the broken line in FIG. 8D, with the pen 18 in accordance with the message 14K (step T16), the CPU 10 determines the specified image area 14L from the coordinate data supplied from the coordinate input section 12 and reads the image in this image area 14L from the second image memory 22 (step T17). The CPU 10 then registers the read image in the image register file 44 in association with the speech (e.g., "I am . . . ") recorded in the voice recording memory 34 as a retrieval key speech as shown in FIG. 9 (step T18). Thereafter, the CPU 10 proceeds to the aforementioned step T8 to clear the first image memory 20 (so that the end command image "circled E" 14I will disappear soon), and repeats the sequence of processes starting from the step T1.

As apparent from the above description, this handwriting apparatus starts recording a speech in the voice recording memory 34 when the voice command image "circled V" 14G is written on the page during handwriting of data, and terminates the voice recording when the end command image "circled E" 14I is handwritten. At the time the voice recording is terminated, the selection menu is displayed to allow the user to select the new registration of an image or the reproduction of the image. When the user operates the pen 18 to select the item "New registration," the operation enters a mode for specifying an image (an area) to be registered and the written image in the specified area is registered in the image register file 44, with the speech recorded in the voice recording memory 34 as a key.

It is of course possible to write a plurality of voice commands (or register plural pieces of voice data) on the same page (see FIG. 9).

When the item "Playback" is selected in the step T13 and such is determined in step T14, some kind of voices or speech (e.g., "I am . . . ") is recorded in the voice recording memory 34 in the sequence of processes from step T1 to step T11. The CPU 10 therefore controls the voice recognizing section 42 to recognize the speech recorded in the voice recording memory 34, and searches the image register file 44 using the recognized speech "I am . . . " as a key (step T19). The CPU 10 reads an image corresponding to the key speech "I am . . . " from the image register file 44 (step T20), and stores the read image in the second image memory 22 at the location corresponding to the position where the end command image "circled E" is written (step T21). Then, the CPU 10 proceeds to the step T8 to clear the first image memory 20 (so that the end command image "circled E" 14I will disappear soon and an image 14M identical to the read image will be displayed at the position of the image "circled E"), and repeats the sequence of processes starting from the step T1.

As apparent from the above, when the item "Playback" is selected on the selection menu using the pen 18, the image register file 44 is searched using the input speech as a retrieval key to read the image corresponding to the key, and the read image is automatically written at the position where the end command image "circled E" 14I has been written.

As described above, with a speech taken as a key, an image handwritten in association with that speech can be input automatically by a voice command.

The start and end of voice recording may be instructed by a predetermined key operation, not by handwritten data.

What is claimed is:

1. An input/output apparatus for inputting and displaying a desired handwritten image using a pen on a display screen, said apparatus comprising:

first input means for inputting an image through an operation of said pen;

second input means for inputting voices;

memory means for storing said image, input through said first input means, as image data and storing said voices, input through said second input means, as voice data;

determining means for determining whether or not image data corresponding to a new image, when the new image is input through said first input means, is stored in said memory means; and voice output means, in response to said determining means, for reading said voice data from said memory means, converting said voice data to voices and outputting said voices, when the determining means determines that the image data corresponding to a new image is stored in said memory means; and said memory means including means for storing plural pieces of image data and plural pieces of voice data in one-to-one association; and said voice output means including means for, when the image data corresponding to the new image is stored in said memory means, reading voice data stored in said memory means in association with said image data, and for outputting voices acquired by converting said voice data.

2. An input/output apparatus for inputting and displaying a desired handwritten image using a pen on a display screen, said apparatus comprising:

image input means for inputting an image through an operation of said pen;

voice input means for inputting voices;

image analyzing means for analyzing a handwritten image input through said image input means;

first control means for controlling start of voice input by said voice input means in response to inputting of the image when the image analyzed by said image analyzing means is a command indicating start of voice recording;

second control means for controlling termination of voice input by said voice input means in response to inputting of the image when the image analyzed by said image analyzing means is a command indicating termination of voice recording;

voice data recording means for recording voices, input through said voice input means, as voice data after inputting of said voices by said voice input means has started and until termination of said inputting of said voices is controlled;

image data storage means for storing an image, input through said image input means, as image data after inputting of said voices by said voice input means has started and until termination of said inputting of said voices is controlled; and voice output means for determining whether or not image data corresponding to a new image, when the new image is input through said image input means, is stored in said image data storage means, and when the image data corresponding to the new image is stored in said image data storage means, reading voice data from said voice data recording means, converting said voice data to voices and outputting said voices.

3. An input/output apparatus for inputting and displaying a desired handwritten image using a pen on a display screen, said apparatus comprising:

first input means for inputting an image through an operation of said pen;

second input means for inputting voices;

memory means for storing voices input through said second input means as voice data, and storing, as image data, an image input through said first input means in association with said voice data;

retrieval means for searching said memory means for voice data equivalent to new voices, when the new voices are input through said second input means; and third input means for reading said image data stored in said memory means in association with said voice data retrieved by said retrieval means, and displaying an image corresponding to said image data on said display screen.

4. The input/output apparatus according to claim 3, wherein said third input means includes means for inputting an image corresponding to said image data at a display position on said display screen specified by said pen.

5. A method of associating and processing handwritten image data and voice data, comprising:

a first step of inputting a start command instructing a start of recording of voice data through an input device;

a second step of inputting an end command instructing an end of recording of the voice data through the input device;

a third step of starting recording of the voice data in response to the start command input in the first step and ending the recording in response to the end command input in the second step;

a fourth step of inputting image data for specifying the voice data recorded in the third step;

a fifth step of associating the voice data recorded in the third step with the image data input in the fourth step;

a sixth step of inputting image data substantially equivalent to the image data input in the fourth step after the step is executed; and a seventh step of outputting the voice data which was recorded in the third step and associates with the image data input in the sixth step, in accordance with the association set in the fifth step.

6. A method of associating and processing handwritten image data and voice data, comprising:

a first step of inputting a start command instructing a start of recording of the voice data;

a second step of inputting an end command instructing an end of recording of the voice data;

a third step of starting recording of the voice data in response to the start command, and ending the recording in response to the end command;

a fourth step of inputting the image data by handwriting;

a fifth step of associating the voice data recorded in the third step and the image data input in the fourth step;

a sixth step of inputting voice data equivalent to the voice data recorded in the third step;

a seventh step of outputting the image data which was recorded in the fourth step and associating with voice data equivalent to the voice data input in the sixth step, in accordance with the association set in the fifth step.

7. A method of associating and processing handwritten image data and voice data, comprising:

a first step of recording voice data;

a second step of inputting and storing handwritten image data;

a third step of associating voice data recorded in the first step and the handwritten image data input in the second step;

a fourth step of inputting handwritten image data;

a fifth step of retrieving handwritten image data, from the handwritten image data input in the second step, which is substantially equivalent to the handwritten image data input in the fourth step;

a sixth step of retrieving voice data associated with the handwritten image data retrieved in the fifth step, in accordance with the association set in the third step; and a seventh step of outputting the voice data retrieved in the sixth step.

8. A method of associating and processing handwritten image data and voice data, comprising:

a first step of recording voice data;

a second step of inputting handwritten image data;

a third step of associating voice data recorded in the first step and the handwritten image data input in the second step;

a fourth step of outputting voice data;

a fifth step retrieving voice data from the voice data input in the first step, which is substantially equivalent to the voice data input in the fourth step;

a sixth step of retrieving handwritten image data associated with the voice data retrieved in the fifth step, in accordance with the association set in the third step; and a seventh step of outputting the image data retrieved in the sixth step.

* * * * *